United States Patent [19]

Spruck et al.

[11] Patent Number: 4,714,823

[45] Date of Patent: Dec. 22, 1987

[54] ATTENUATOR FOR EXTRANEOUS LIGHT FLUCTUATIONS IN A MICROSCOPE WITH AUTOMATIC BRIGHTNESS CONTROL

[75] Inventors: Bernd Spruck, Heubach-Lautern; Siegfried Gerber, deceased, late of Oberkochen, both of Fed. Rep. of Germany, by Hannelore Gerber, Silvia Gerber, Eberhard Gerber, Bernhard Gerber, legal representatives

[73] Assignee: Carl-Zeiss-Stiftung, Oberkochen, Fed. Rep. of Germany

[21] Appl. No.: 845,964

[22] Filed: Mar. 31, 1986

[30] Foreign Application Priority Data

Apr. 12, 1985 [DE] Fed. Rep. of Germany ....... 3513146
Oct. 7, 1985 [DE] Fed. Rep. of Germany ....... 3535749

[51] Int. Cl.⁴ .............................................. G01J 1/32
[52] U.S. Cl. ..................................... 250/205; 250/229
[58] Field of Search ...................... 250/205, 204, 229; 315/149

[56] References Cited

U.S. PATENT DOCUMENTS 3,872,302  3/1975  Fender ................................. 250/205
4,117,375  9/1978  Bachur et al. ....................... 250/205
4,555,620  11/1985 Bridson et al. ...................... 250/205

FOREIGN PATENT DOCUMENTS 1224835  9/1966  Fed. Rep. of Germany ...... 250/205

Primary Examiner—David C. Nelms
Assistant Examiner—Stephone B. Allen
Attorney, Agent, or Firm—Hopgood, Calimafde, Kalil, Blaustein & Judlowe

[57] ABSTRACT

A sensor for determining image brightness in the viewing-ray path of a microscope is so utilized as (1) to control the intensity of light for object illumination and (2) to black out or darken the viewing-ray path while switching optical elements such as from one to a selected other of a plurality of turret-mounted objective lenses. The arrangement assures that an observer will not be dazzled by sudden brightness in the course of lens switching or in the course of switching from use of one to use of another of a plurality of contrasting methods.

6 Claims, 2 Drawing Figures

ATTENUATOR FOR EXTRANEOUS LIGHT FLUCTUATIONS IN A MICROSCOPE WITH AUTOMATIC BRIGHTNESS CONTROL

BACKGROUND OF THE INVENTION

In use of microscopes, the eyes of the user are often subjected to light conditions which differ greatly. For example, different contrasting methods, such as bright-field, dark-field and phase-contrast, give different image brightnesses, and the brightness of the image also changes as a function of the current numerical aperture of the objective when switching lenses, e.g., when changing from one to another objective. These brightness changes occur suddenly, upon making the lens change. In addition, the eye can be exposed to other light flashes, as when indexing the lens turret or when switching incident-light reflectors, in that light can impinge on the barrels of the interchangeable optics and can thus be reflected directly into an eyepiece.

Such switching processes are dazzling to the observer. To avoid this problem, the observer ordinarily, before switching, turns down the potentiometer for brightness control of microscope illumination, and then carefully turns it up again. But this procedure is cumbersome and must be acquired as a habit, and it does not definitely prevent the observer from being dazzled by excessive brightness.

From European Patent No. EP-Al-0 124 241, a device is known for controlling brightness in a microscope. The known device employs a computer which calculates optimal image brightness from data (such as diaphragms and other factors) for the objective which is currently in operating position, and controls the source of light and additional filters accordingly. But this device does not afford any protection against light flashes which are attributable to switching processes.

In West German Patent No. 3,222,915, an automatic brightness control is described for the image of a mark which is reflected into the ray path of the microscope. This automatic system contains a sensor in the viewing-ray path and, by intensity control of an auxiliary source of light, adapts the brightness of the mark to the brightness of the image in the viewing-ray path. However, the microscope illumination itself is not affected by this automatic system; neither is there anti-dazzle protection for switching processes.

BRIEF STATEMENT OF THE INVENTION

The object of the invention is to provide a simple device for controlling brightness in microscopes, whereby, on the one hand, the visually perceived brightness of the image is maintained substantially constant while, on the other hand, the observer cannot be dazzled in the course of switching processes.

The invention achieves this object by so connecting a sensor of image brightness in the viewing-ray path as (1) to control intensity of light for object illumination and (2) to black out or darken the ray path while switching optical elements, such as the plural objectives of a lens turret.

The black-out arrangement may illustratively be a control circuit for actuating a diaphragm which interrupts the ray path between the source of light and the eye lens of the eyepiece; an electromagnetically actuated folding diaphragm is preferred. Such a diaphragm is arranged either in the illumination-ray path itself or in the viewing-ray path, advisedly in the vicinity of the eye lens of the eyepiece.

Alternatively, the black-out arrangement may be operative upon the circuit for controlling intensity of the light source, to darken or dim the light source upon detection of an increase above or a decrease below pre-set brightness values. The arrangement preferably contains one or more threshold switches by which the illumination can be interrupted or darkened whenever an adjustable maximum luminous intensity is exceeded, or when illumination drops below an adjustable minimum luminous intensity. To increase speed of operation, it is furthermore advisable for the arrangement to contain a differentiator which recognizes sudden changes in light intensity, even before reaching the intensity-threshold setting.

DETAILED DESCRIPTION

Figure 1:
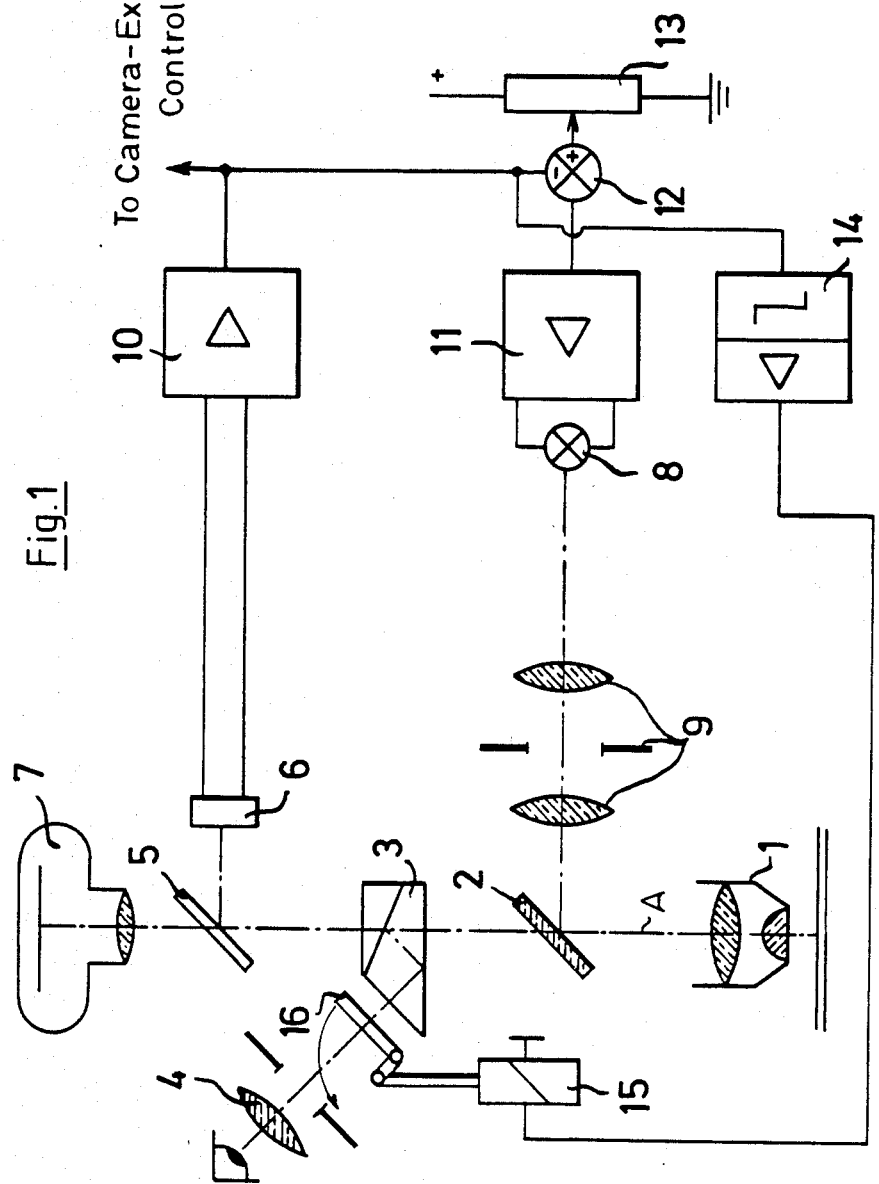
Figure 2:
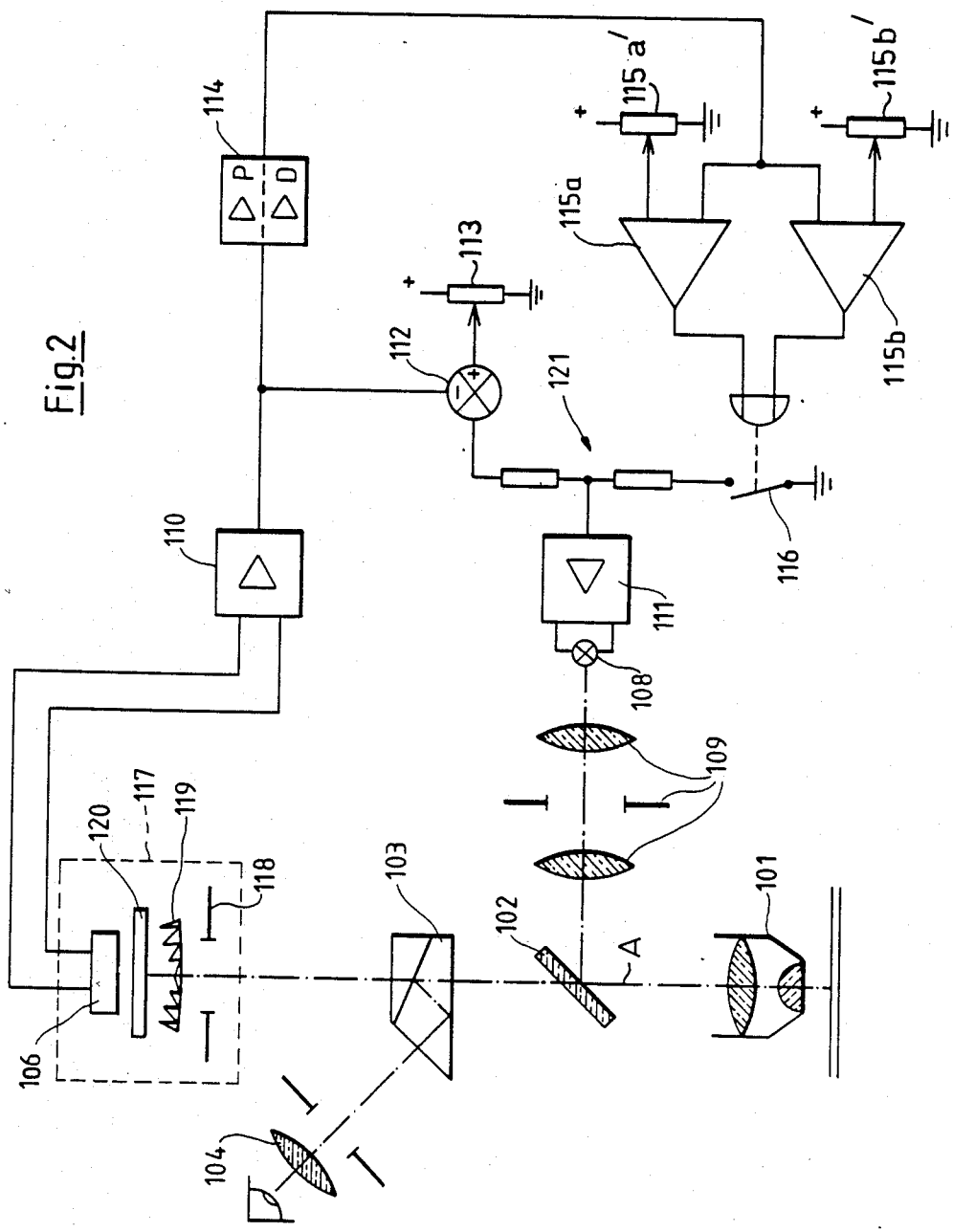

The invention will be illustratively described in detail in conjunction with the accompanying drawings, in which:

FIG. 1 is a schematic diagram of a microscope having provision for brightness control; and FIG. 2 is a similar diagram for a particularly advantageous further embodiment.

The optical system of the viewing-ray path A of the microscope of FIG. 1 comprises an objective 1, a reflection mirror 2, a beam-splitting prism 3 for reflecting the ray path to an eyepiece 4, a second beam splitter 5 to reflect onto a sensor or photoreceiver 6 a small percentage of light from objective 1, and an attachment camera 7. An amplifier 10 is connected to the output of photoreceiver 6, and the reflection mirror 2 will be understood to be mounted to a slide, turret or the like for interchangeable provision of different types of illumination.

Normally, the photoreceiver 6 is used as a light meter, for exposure controlling of camera 7; output for this purpose is indicated by legend. In accordance with the invention, photoreceiver 6 also serves to control intensity of the light source 8 of an incident-light illuminating device 9, shown schematically in the drawing.

For this purpose, the output signal of amplifier 10 is one of the inputs to a summation device 12, the other input of which is supplied by the tap of a potentiometer 13 for manual selection of brightness setting. At the device 12, the output voltage of amplifier 10 and the potentiometer-tap voltage are superposed in opposite polarity, and the resultant signal is fed to the power output stage 11 of current supply to light source 8. With the proper adjustment of amplification factors, the basic brightness of the intermediate image in the eyepiece 4, which brightness has been set at potentiometer 13, does not change; for example, upon making a change of objective lens 1, the detector 6 recognizes any brightness change in the ray path, and the brightness change is automatically compensated by a change of voltage to the light source 8.

The output of amplifier 10 is additionally connected to a circuit 14 which contains essentially a threshold switch and provides means for controlling a solenoid 15. Solenoid 15 actuates a folding diaphragm 16 arranged in front of the eyepiece 4.

If the brightness measured by sensor 6 exceeds the preset threshold value, diaphragm 16 is immediately actuated to cover the viewing-ray path, until the basic brightness setting is restored via the control circuit 6-10-11-8. The speed with which this is accomplished will be understood to assure cut off of eye exposure to such light as may persist from light source 8, which in the case of an incandescent bulb is relatively inert, i.e., slow to diminish.

It will be understood that the invention can also be used in a microscope having no camera attachment, in which case the sensor 6 and its mirror 5 may be positioned elsewhere in the viewing-ray path, as for example directly in front of diaphragm 16.

It is also possible to increase the speed of actuation of diaphragm 16 by providing differentiating means in the circuit 14, thereby supplying a solenoid-actuating pulse as soon as a detected rate of change of brightness exceeds a rate-threshold value.

Optical construction of the microscope of FIG. 2 corresponds essentially to that of the microscope of FIG. 1; it is therefore unnecessary to redescribe the parts 101 to 104, and 109. The microscope of FIG. 2 will be seen to have no provision for camera attachment; in its place, a structural unit 117, developed as a removable additional component, has been mounted to the corresponding outlet of the microscope tube. This structural unit contains photoreceiver 106 for brightness control of the light source 108.

The output signal of receiver 106 is proportional to image brightness perceived by the observer at eyepiece 104. The signal is processed by an amplifier 110 to summation means 112, where it is added in polarity-opposed relation to the tap signal of a potentiometer 113 serving for manual adjustment of brightness. The sum signal passes via a voltage divider 121 to the input of the power end stage 111 of the current supply for light source 108, for the incident illumination of the microscope.

The basic brightness perceived by the observer is maintained constant by the described control circuit.

Within the structural unit 117, a diaphragm 118, a converging Fresnel lens 119 and a color filter 120 of blue glass, for instance BG 39, are positioned in front of the receiver 106. The converging lens 119 focuses light from the objective 101 onto receiver 106, in the manner of a collimator. In this way, assurance is had that, even when swinging the turret to change objective 101, the illuminated region of the specimen remains imaged on the receiver 106. The color filter 120 serves to adapt the spectral sensitivity of receiver 106 (with its maximum located in the red) to that of the human eye. The filter 120 furthermore prevents the color temperature of the light from changing greatly during the course of the described brightness control. Thus, if upon switching of the microscope optics to bright-field or to an objective of small magnification, the described control reduces the lamp voltage, this would, without a filter, lead to a relatively strong change in the color temperature of the illuminating light. But since the filter characteristic is downward-sloping in the direction of longer wavelengths, there is a corresponding decrease in sensitivity to color temperature, so that sensor 106 response to changes in color temperature is minimized and effectively neutralized.

The output of amplifier 110 is also connected to the input of a so-called PD amplifier 114, i.e., it contains a differentiator. Therefore, the output signal of PD amplifier 114 is characterized by a portion which corresponds to input-signal change (i.e., increase or decrease in brightness), in addition to a portion proportional to the input signal. The PD-amplifier output signal is supplied in parallel to two comparators 115a and 115b, which are preset at potentiometers 115a' and 115b' to upper and lower thresholds. If the PD-amplifier signal is above or below the preset limit values of comparators 115a and 115b, a switch 116 is actuated, which places the voltage divider 121 in operation and reduces the light-source control voltage.

The operation of the arrangement formed by the elements 114 to 116 is as follows:

A sudden increase in brightness, as can occur upon switching from dark-field to bright-field illumination, is rapidly transmitted further via the PD amplifier 114. The comparator 115a, set to the upper switch threshold, then responds and closes the switch 116. As a result of closing switch 116, lamp 108 is "clamped" at low brightness until the increase in brightness has passed and the control loop, via the summation means 112, has adjusted itself to the changed conditions.

It may also happen that, during the course of a switching process, as for example, upon a turret swing of objective 101 away from axis A, no light whatsoever initially impinges on the receiver 106. The control loop via summation means 112 thus would attempt to counteract this transient condition by brightening the lamp 108. Upon subsequent swing of a new objective of lesser magnification into axis A, the brightness of the lamp would then have to be again brought down relatively rapidly; but this entails difficulties, due to the inertia of the filament of an incandescent bulb. The comparator 115b, set to the lower threshold, detects this intermediate state of reduced image brightness in the course of objective-lens switching and also reduces (via switch 116) the voltage to lamp 108, and this reduction is operative during the swinging movement of the objective. The ensuing adjustment to the brightness value adapted to the new objective then takes place starting from a darkened condition, so that any dazzling of the observer is definitely avoided.

What is claimed is:

1. In a microscope having an objective and an eyepiece disposed in a path of a viewing ray, a light source for object illumination, a photoreceiver coupler to said viewing ray path for providing an output signal as a function of the intensity of light transversing said path, first control means coupled to said photoreceiver and to said light source for automatically maintaining a preselected level of intensity of said light source, means for selectably including in said ray path any of a plurality of available optical elements, and second control means for decreasing said light along said path during the operation of changing said included optical element, said second control means comprising: first and second threshold means coupled to said photoreceiver for providing, respectively, a first and second threshold output signal, said threshold output signals being provided by said first and second threshold means, respectively, whenever a differentiated signal from said photoreceiver rises above one predetermined level or falls below another predetermined level lower than said one predetermined level, and means responsive to said threshold output signals for reducing said light source intensity.

2. In a microscope having an objective and an eyepiece disposed in the path of a viewing ray, a light source for object illumination, a photoreceiver coupled to said viewing ray path for providing an output signal as a function of the intensity of light traversing said path, first control means coupled to said photoreceiver and to said light source for automatically maintaining a preselected level of intensity of said light source, means for selectably including in said ray path any one of a plurality of available optical elements, and second control means for decreasing said light along said path during the operation of changing said included optical element, said second control means comprising: differentiating means responsive to the rate of change of said output signal from said photoreceiver for providing a differentiated signal, threshold means responsive to said differentiated signal for producing a second output signal whenever said differentiated signal exceeds a predetermined level, and an electro-mechanically operated obturator disposed in said viewing ray path in the vicinity of said eyepiece and coupled to said threshold means responsive to said second output signal for preventing said viewing ray from reaching said eyepiece.

3. In a microscope having an objective and an eyepiece disposed in a path of a viewing ray, a light source for object illumination, a photoreceiver coupled to said viewing ray path for providing an output signal as a function of the intensity of light transversing said path, first control means coupled to said photoreceiver and to said light source for automatically maintaining a preselected level of intensity of said light source, means for selectably including in said ray path any of a plurality of available optical elements, and second control means for decreasing said light along said path during the operation of changing said included optical element, said second control means comprising: differentiating means responsive to the rate of change of said output signal from said photoreceiver for providing a differentiated signal, first and second threshold means responsive to said differentiated signal for providing, respectively, a second and third output signal, one of said threshold means providing said second output signal whenever said differentiated signal exceeds a predetermined level, the other said threshold means providing 4. A microscope according to claim 1, characterized by the fact that a color filter (120) is arranged in front of said photoreceiver for filtering light traveling to said photoreceiver (106).

5. A microscope according to claim 13, characterized by the fact that a converging lens (119) is arranged in front of said photoreceiver for collimating light traveling to said photoreceiver.

6. A microscope according to claim 5, characterized by the fact that said photoreceiver, said converging lens (119) and a color filter (120) are combined in a common structural unit (117) that is attachable to a microscope tube.

* * * * *